United States Patent [19]

Ogawa

[11] Patent Number: 5,001,940
[45] Date of Patent: Mar. 26, 1991

[54] GYRO FOR DETECTING SIGNALS ALONG TWO AXES

[75] Inventor: Naoki Ogawa, Nagoya, Japan

[73] Assignee: Aisin Seiki Kabushiki Kaisha, Kariya, Japan

[21] Appl. No.: 433,268

[22] Filed: Nov. 8, 1989

[30] Foreign Application Priority Data

Nov. 9, 1988 [JP] Japan ................ 63-283159

[51] Int. Cl.⁵ .................. G01C 19/28; G01P 15/00
[52] U.S. Cl. .................. 74/5.6 D; 73/505; 73/517 AV; 74/5 R
[58] Field of Search ............ 74/5.6 D, 5 R; 73/517 AV, 505

[56] References Cited

U.S. PATENT DOCUMENTS

| | | | |
|---|---|---|---|
| 2,716,893 | 9/1955 | Birdsall | 74/5 R |
| 3,143,889 | 8/1964 | Simmons et al. | 74/5 R X |
| 3,206,985 | 9/1965 | Christensen | 74/5 R |
| 3,842,681 | 10/1974 | Mumme | 73/505 |
| 4,898,032 | 2/1990 | Voles | 73/505 |

FOREIGN PATENT DOCUMENTS

WO89/10567 11/1989 World Int. Prop. O. ..... 73/517 AV

Primary Examiner—Rodney H. Bonck
Attorney, Agent, or Firm—Burns, Doane, Swecker & Mathis

[57] ABSTRACT

A gyro comprises a support member and a rod member supported by the support member. A vibrator attached to the rod member has two pairs of vibrating members projecting at right angles to the rod member. A driving mechanism is attached to the rod member and includes piezo electric devices for generating vibrations. A detector is arranged for detecting strains in the vibrating members of the vibrator.

8 Claims, 6 Drawing Sheets

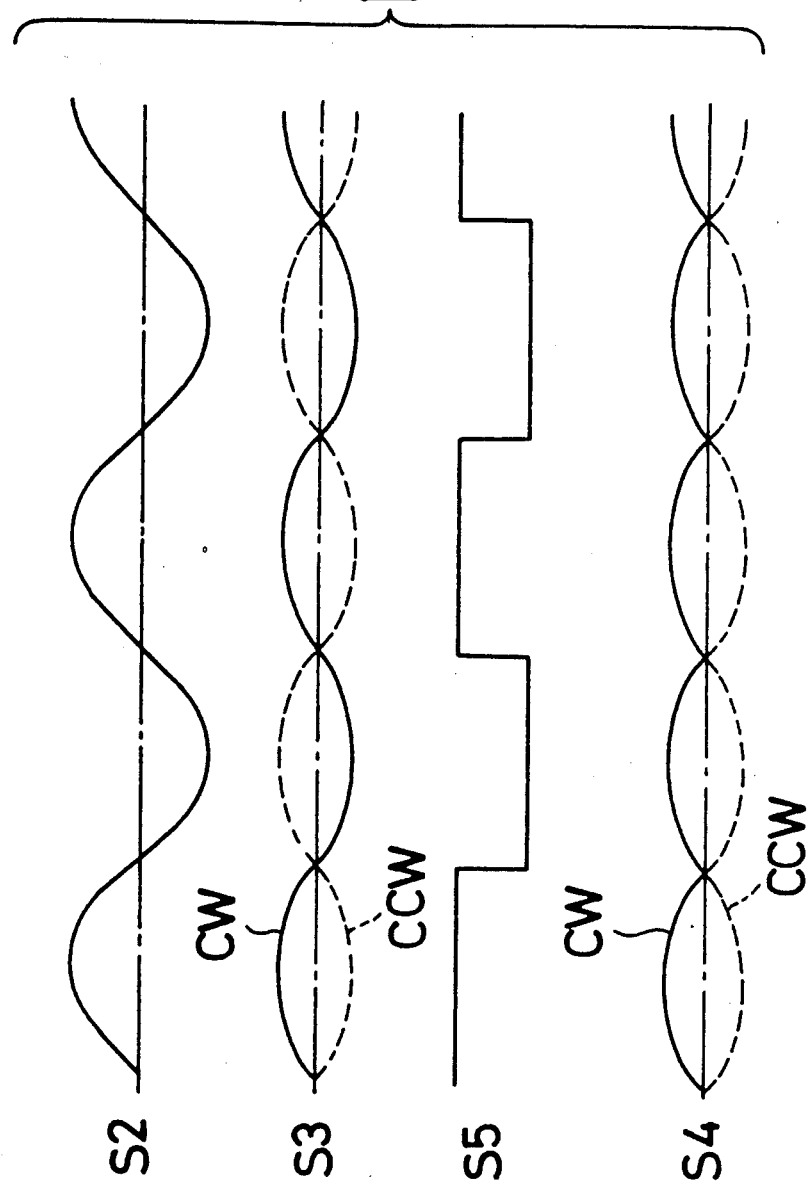

GYRO FOR DETECTING SIGNALS ALONG TWO AXES

BACKGROUND OF THE INVENTION

1. Field of the Invention

This invention relates to a gyro, especially to a gyro which relies upon vibration to detect a rotational signal. Further, this invention relates to a gyro which has two rotational axes to be detected.

2. Description of Related Art

A conventional gyro is shown in U.S. Pat. No. 2,716,893. In that type of gyro, a rotation is detected by sensing a Corioli's force. Therefore, a force of inertia must be applied to a member which receives a Corioli's force. Further the member has to face two rotational axes in order to detect two rotational signals. The member which receives a Corioli's force should face toward two rotational axes and a constant force of inertia should be applied thereto. A conventional gyro includes an electric motor to rotate the member which receives a Corioli's force and detects a Corioli's force when the axis of the member matches with the rotational axis. Such a conventional gyro has drawbacks as follows. (1) An inertia force is generated by a rotational movement of a member by an electric motor. The member has mechanical frictional parts such as bearings. Therefore, a wearing of mechanical parts shortens the gyro life. Further, the electric coil of the motor loses power as time passes. (2) Because the member is rotating, the axis of the member only briefly matches the detection axes to detect a Corioli's force. Therefore, a successive detection of a Corioli's force of the member is not possible. (3) Accuracy of detection is relatively low. (4) Because a rotational movement is involved, the mechanism must be complicated in order to support the rotation. The size of parts is important and assembly of the parts is difficult. Each gyro must be adjusted when it is assembled.

SUMMARY OF PREFERRED EMBODIMENTS OF THE INVENTION

An object of the present invention is to provide a gyro which alleviates the above-mentioned drawbacks, especially to provide a gyro which can detect a successive Corioli's force in two axes. Other objects will be apparent from an understanding of the invention.

In accordance with this invention, a gyro comprises a support member, a rod member supported by the support member, a vibrator having two pair of vibrating portions projecting toward the right angles to the rod member and attached to the rod member, driving means for generating vibrations having piezo electric devices and attached to the rod member, and detecting means for detecting strains generating at the vibrating portions of the vibrator. The gyro further comprises an electric circuit supplying electric power to the driving means and receiving a signal from the detecting means In this invention, when an electric power is applied to the piezo electric devices of the driving means, the piezo electric devices create strains which cause the rod member to rotate about the axis of the rod member. If the electric power is AC, the direction of the strains are changed frequently. Therefore, if one end of the piezo electric device is connected with the driving means, the driving means imparts vibrations about the rod axis. This constant vibration gives the driving means a force of inertia. Thus, Corioli's force is generated at the vibrating portions. A Corioli's force appears at one pair of the vibrating portions and another Corioli's force appears at another pair of the vibrating portions. The vibrating portions have detecting means so that these Corioli's forces can be detected continuously. The degrees of the vibrations are less than 0.1 degree because the vibrations are generated by the strains of the piezo electric device. The movements of the faces of the vibrating portions are considered to be very small. Therefore, the influence of the vibrations of the vibrating portions on the detected signals is very small. Thus, a gyro in accordance with the present invention can detect a successive Corioli's force along two axes.

BRIEF DESCRIPTION OF THE DRAWINGS

The objects and advantages of the invention will become apparent from the following detailed description of preferred embodiments thereof in connection with the accompanying drawings in which:

FIG. 4b is a graph showing operations of rectifier circuits 12x and 12y of FIG. 4a;

DETAILED DESCRIPTION OF PREFERRED EMBODIMENTS OF THE INVENTION

Figure 1:
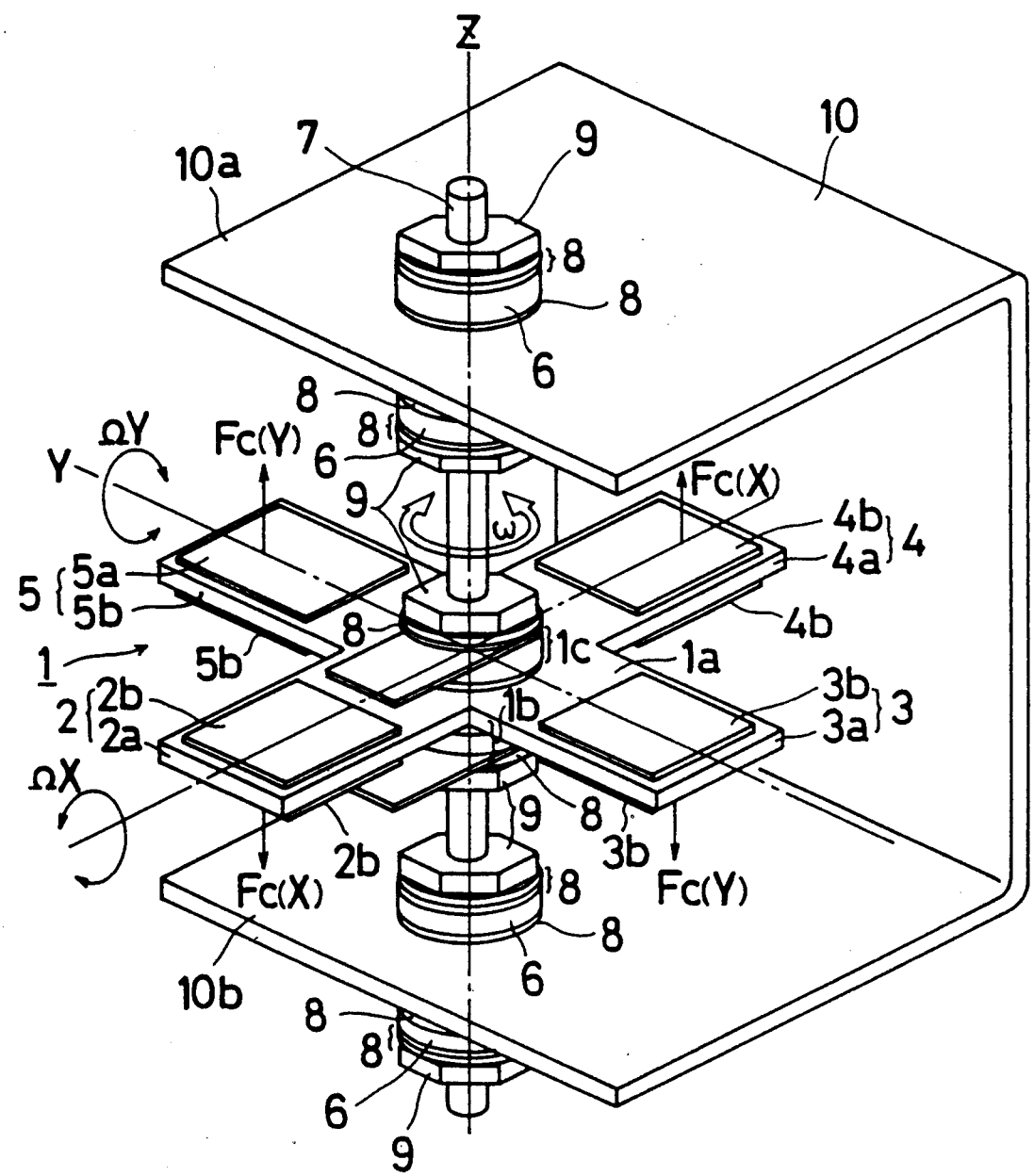
FIG. 1 is a perspective view of an embodiment of a gyro, in accordance with the present invention.

FIG. 1 shows an embodiment of a gyro of the present invention. Referring to FIG. 1, axes X, Y, and Z comprise a coordinate system of three axes placed in 90 degree relationship to each other. A support member 10 is made of a metal plate bent in U-shape. A screw rod 7 made of metal is mounted in the legs 10a, 10b of the support member 10. The ends of the rod 7 are fixed to the legs 10a and 10b of the support member 10, respectively, by washers 8, insulators 6, and lock nuts 9. The insulators 6 prevent external vibrations and impacts from being transmitted to the vibrator and vice versa. The rod 7 coincides with the Z axis.

A vibrator 1 is arranged at the middle of the rod 7. The vibrator 1 comprises a vibrator plate 1a made of thin metal in a cross-shape. The upper and lower surfaces of the vibrator plate 1a are placed at right angles to the Z axis. The upper surface of the vibrator 1a has a detector 1c, and the bottom surface of the vibrator 1a has a driver 1b. The detector 1c and driver 1b are shaped cylindrically and arranged to sandwich the vibrator plate therebetween. The rod 7 supports the vibrator plate 1a, driver 1b, and detector 1c. The vibrator 1 is fixed by washers 8 and nuts 9 so that a movement of the vibrator 1 along the Z axis is prevented. The rod 7 is fixed to the support member 10 at both ends such that a bending of the rod 7 is prevented. This also prevents vibrations from being transferred to the outside. Further a detective axle is fixed correctly.

The vibrator 1 has four vibrating members 2, 3, 4 and 5. The vibrating members 2 and 4 and the rod 7 are placed in a line along the X axis. The vibrating members 3 and 5 and the rod 7 are placed in a line along the Y axis. The vibrating members 2, 3, 4 and 5 have two piezo electric devices 2a, 2b; 3a, 3b; 4a, 4b; and 5a, 5b, respectively.

Figure 2:
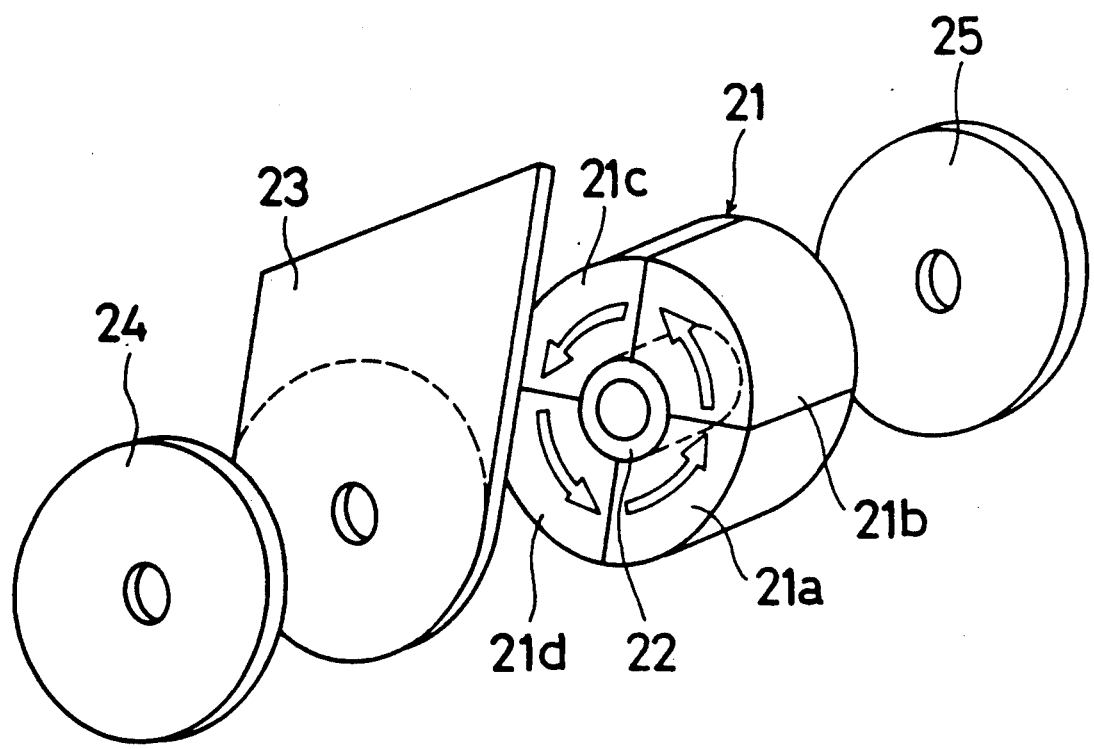
FIG. 2 is a perspective view of a movable body of the gyro of FIG. 1.

FIG. 2 shows the driver 1b. Referring to FIG. 2, the driver 1b has an insulating tube 22 surrounded by a piezo electric member 21. At the ends of the piezo electric member 21, a plus electrode 23 and negative electrode 25 are provided. An insulating washer 24 is placed at the plus electrode 23 side. The piezo electric member 21 comprises four piezo electric devices 21a, 21b, 21c, and 21d. A polarization is established as indicated by the arrows shown in FIG. 2.

When electric power is applied to the electrodes 23 and 25, the piezo electric member 21 generates a strain about the Z axis. The bottom of the driver 1b is fixed to the rod 7 by the washer 8 and nut 9 as shown in FIG. 1. The upper side of the driver 1b rotates around the Z axis. The upper side contacts a bottom surface of the vibrator plate 1a so that the vibrator plate 1a vibrates about the Z axis. The detector 1c comprises the same structure as the driver 1b. Therefore, when a strain is applied to the detector 1c, the detector 1c generates a voltage between the electrodes. As shown in FIG. 1, the upper side of the detector 1c is fixed to the rod 7 by the washer 8 and nut 9 and the bottom side of the detector 1c contacts a top surface of the vibrator plate so that the vibration of the vibrator plate 1a is transmitted to the detector 1c and a voltage is generated in accordance with the vibration.

In FIG. 1, the vibration of the vibrator 1 about the Z axis creates a force of inertia. If the device rotates about the X axis, a Corioli's force Fc(x) is applied to the vibrator members 2 and 4. If the device rotates about the Y axis, a Corioli's force Fc(y) is applied to the vibrator members 3 and 5. Thus, the Corioli's forces generated by rotations about the X and Y axes are detected by the piezo electric devices of the vibrating members 2, 3, 4 and 5.

Figure 3:
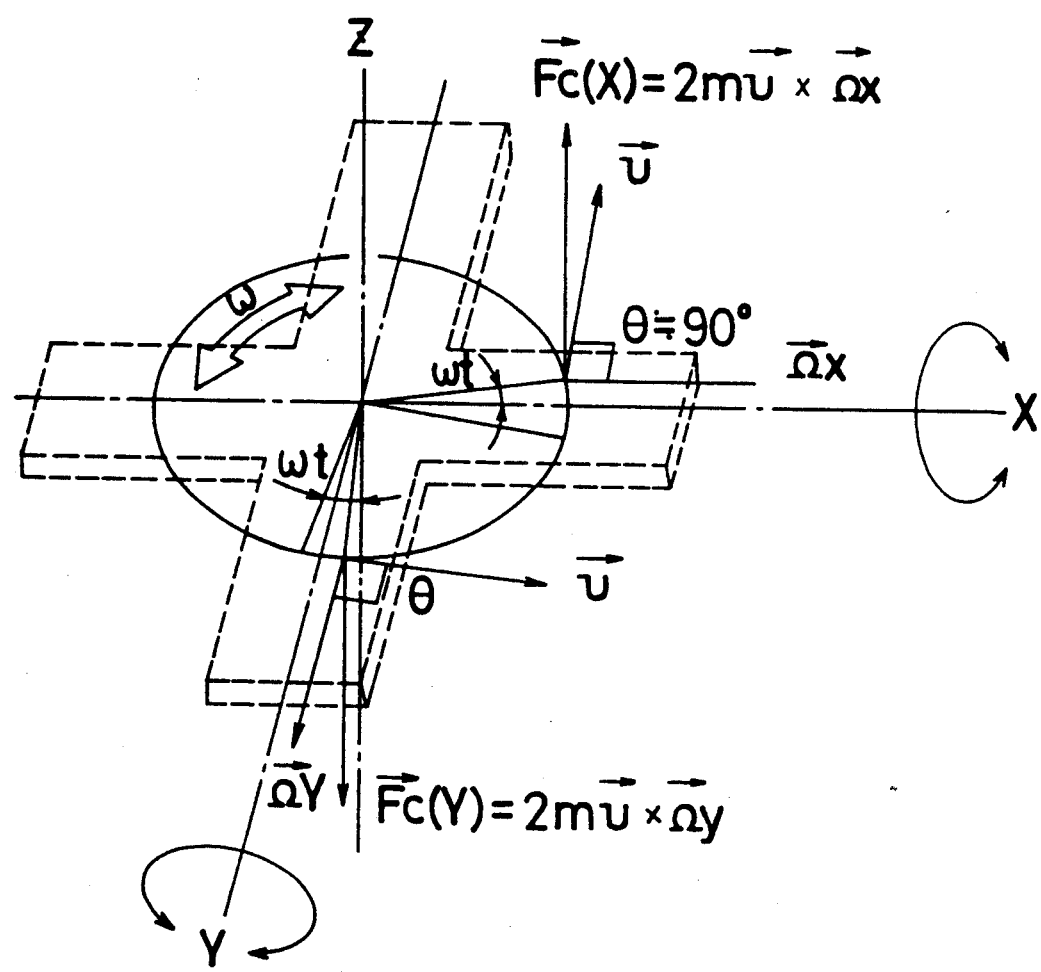
FIG. 3 is a schematic view of the gyro of FIG. 1 showing a vector arrangement of forces.

Referring to FIG. 3, in the inertia system having a velocity V about the Z axis, an angular velocity $\Omega x$ about the X axis and an angular velocity $\Omega y$ about the Y axis generate the Corioli's force Fc, respectively. A centrifugal force T generated by an angular velocity $\Omega x$ in this system is described in the formula (I), wherein a mass is M and a radius is R:

$$T = M \cdot R \cdot (V + \Omega x)^2$$

$$R = M \cdot R \cdot V^2 + M \cdot R \cdot \Omega x^2 + M \cdot R \cdot V \cdot \Omega x \quad (I)$$

wherein, $M \cdot R \cdot V^2$ is a centrifugal force generated by velocity V, $M \cdot R \cdot \Omega x^2$ is a centrifugal force generated by angular velocity $\Omega x$ and $M \cdot R \cdot V \cdot \Omega x$ is Corioli's force Fc. Velocity V and angular velocity $\Omega x$ are vectors, therefore, if a vector product is shown as $V \times \Omega x$, Corioli's force Fc is described in the formula (II):

$$Fc = M \cdot R \cdot V \times \Omega x \quad (II)$$

In FIG. 1, an inertia movement is a rotational movement (vibration) about the Z axis generated by the driver 1b; velocity V is shown as the formula (III):

$$V = r \cdot w \cdot Cos(wt) \quad (III)$$

wherein, r is a radiant, w is angular velocity. If an angle between V and $\Omega x$ and axes is $\emptyset$, $$V \times \Omega x = V \cdot \Omega x \cdot Sin(\emptyset) \quad (IV)$$

If $\emptyset$ is 90 degrees, $$V \times \Omega x = V \cdot \Omega x \quad (V)$$
$$= r \cdot w \cdot \Omega x \cdot Cos(wt).$$

An angular velocity $\Omega y$ about the Y axis is considered to be the same. Therefore, Corioli's force Fc(x) on the X axis and Corioli's force Fc(y) on the Y axis are shown as follows:

$$Fc(x) = M \cdot R \cdot r \cdot w \cdot \Omega x \cdot Cos(wt)$$

$$Fc(y) = M \cdot R \cdot r \cdot w \cdot \Omega y \cdot Cos(wt) \quad (VI)$$

In the formula (VI), M, R, and w are constant, thus Corioli's forces Fc(x) and Fc(y) are in response to angular velocities $\Omega x$ and $\Omega y$, respectively.

Figure 4A:
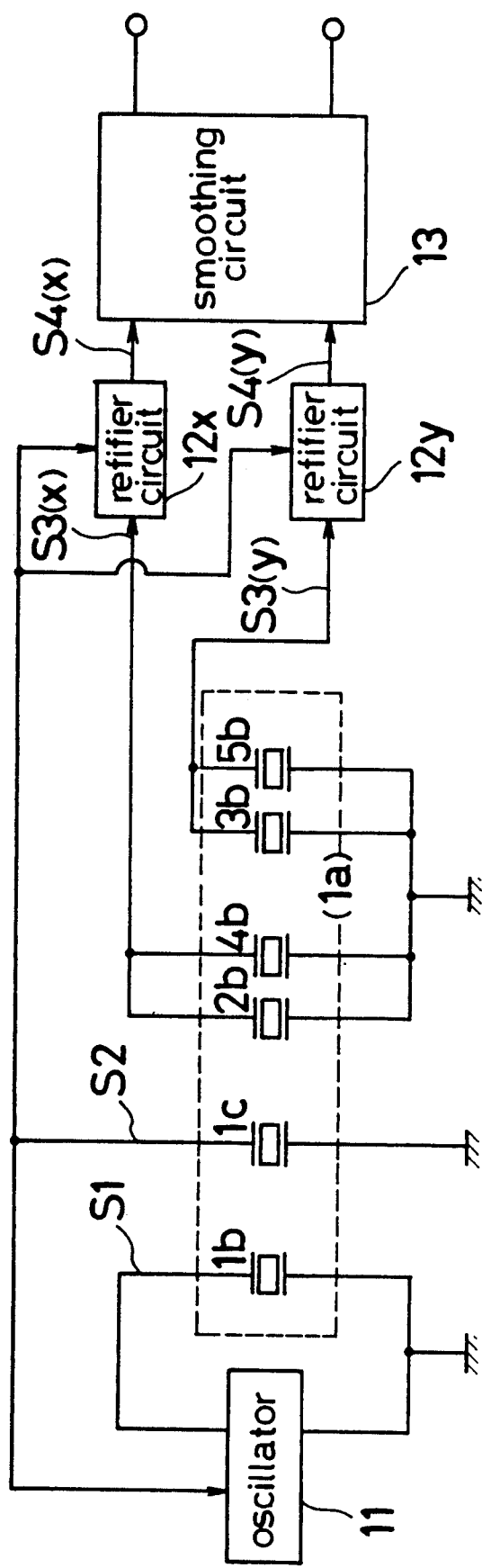
FIG. 4a is a block diagram of an electric circuit of a gyro in accordance with the present invention.

FIG. 4a shows an electric circuit for the device. Referring to FIG. 4a, a signal S1 of an oscillator 11 is applied to the driver 1b. A signal S2 from the detector 1c is added to the oscillator 11 as a feedback signal. The oscillator 11 outputs a sine wave as the signal S1. The feedback signal S2 stabilizes the oscillation of the oscillator 11. The feedback signal S2 is also applied to rectifier circuits 12x and 12y as a synchronizing signal. The piezo electric devices 2b and 4b of the vibrating members 2 and 4 of the vibrator 1a are connected in parallel. The output signal S3(x) of the piezo electric devices 2b and 4b is connected to the rectifier circuit 12x. The piezo electric devices 3b and 5b of the vibrating members 3 and 5 of the vibrator 1a are connected in parallel. The output signal S3(y) of the piezo electric devices 3b and 5b is connected to the rectifier circuit 12y.

FIG. 4b shows operations of the rectifier circuit 12x and 12y. Referring to FIG. 4b, the output signal S3 of the piezo electric devices is a sine wave synchronized with the feedback signal S2. The directions of the angular velocity along the axes (X,Y) make the phase of the signal S3 in reverse. For example, if the signal S3 is shown as CW in FIG. 4b when the direction of the angular velocity is clockwise, the signal S3 is shown as CCW when the direction of the angular velocity is counterclockwise. The rectifier circuits 12x and 12y generate rectangular wave S5 and rectify the signal S3 synchronously with the rectangular wave S5 and output signal S4. As shown in FIG. 4b, the signal S4 has a positive polarity. The output signals S4(x) and S4(y) of the rectifier circuits 12x and 12y are changed into direct current by the smoothing circuit 13. This direct current voltage indicates magnitude and direction of the angular velocity.

Figure 5:
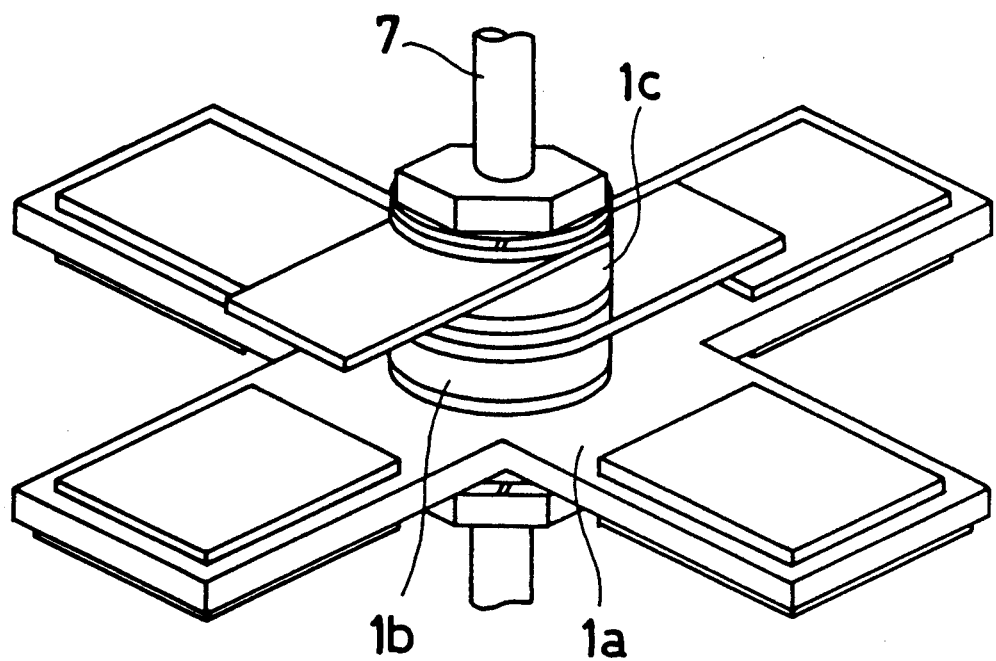
FIG. 5 is a perspective view of a second embodiment of a gyro, in accordance with the present invention.

FIG. 5 shows another embodiment of a gyro according to the present invention. In this embodiment a vibrating plate 1a, a driver 1b and a detector 1c are placed in different positions from the first embodiment. The driver 1h is inserted between the vibrator plate 1a and the detector 1c. The rest of the components are the same as in the first embodiment.

Although the invention has been described in connection with preferred embodiments thereof, it will be appreciated by those skilled in the art that additions, substitutions, modifications and deletions not specifically described, may be made without departing from the spirit and scope of the invention as defined in the appended claims.

What is claimed is:
1. A gyro comprising:

a support member, a rod member supported by said support member and defining an axis, a vibrator attached to said rod member and including two pairs of vibrating members projecting at right angles to said rod member, said vibrator including first and second surfaces, said first surface facing in a first axial direction, and said second surface facing in an opposite second axial direction, driving means attached to said rod member and engaging said first surface of said vibrator and including piezo electric devices for generating vibrations which are transmitted to said vibrator, and detecting means arranged for detecting strains in said vibrating member of said vibrator, said detecting means being attached to said rod member and engaging said second surface of said vibrator coaxially relative to said driving means so that vibrations of said vibrator are detected by said detecting means.

2. A gyro in accordance with claim 1, wherein said driving means includes a plurality of piezo electric devices shaped in an arc to define together a circular plate and a plurality of said circular plates arranged to define a cylindrical driving means.

3. A gyro in accordance with claim 1 further comprising an electric circuit for supplying electric power to said driving means and for receiving a signal from said detecting means.

4. A gyro in accordance with claim 3, said detector including piezo electric devices attached to said rod member and connected to said electric circuit so that a signal from said detector defines a feedback signal.

5. A gyro according to claim 1 wherein said vibrator includes piezo electric devices connected to at least one of said first and second surfaces, said piezo electric devices being spaced from said detecting means in a direction oriented generally radially with reference to said axis.

6. A gyro comprising:

a support member, a rod member supported by said support member, a vibrator attached to said rod member and including two pairs of vibrating members projecting at right angles to said rod member, driving means attached to said rod member and including piezo electric devices for generating vibrations, said driving means including a plurality of piezo electric devices shaped in an arc to define together a circular plate, and a plurality of said circular plates arranged to define a cylindrical driving means, and detecting means arranged for detecting strains in said vibrating members of said vibrator.

7. A gyro in accordance with claim 6 further comprising an electric circuit for supplying electric power to said driving means and for receiving a signal from said detecting means.

8. A gyro in accordance with claim 7, said detector including piezo electric devices attached to said rod member and connected to said electric circuit so that a signal from said detector defines a feedback signal.

* * * * *